United States Patent [19]

Follen et al.

[11] 4,197,537

[45] Apr. 8, 1980

[54] INTRUDER DETECTION SYSTEM

[75] Inventors: Robert J. Follen, Minneapolis; Baard H. Thue, Circle Pines, both of Minn.

[73] Assignee: Honeywell Inc., Minneapolis, Minn.

[21] Appl. No.: 866,320

[22] Filed: Jan. 3, 1978

Related U.S. Application Data

[63] Continuation of Ser. No. 715,739, Aug. 19, 1976, abandoned.

[51] Int. Cl.$^2$ .......................... G01S 9/42; G08B 13/22
[52] U.S. Cl. .................................. 343/5 PD; 340/552; 340/554
[58] Field of Search ............. 340/552, 554; 343/5 PD

[56] References Cited

U.S. PATENT DOCUMENTS

| 3,723,738 | 3/1973 | Brenner et al. | 343/5 PD X |
| 3,815,131 | 6/1974 | Dautel et al. | 343/5 PD |
| 3,967,283 | 6/1976 | Clark et al. | 340/554 X |

FOREIGN PATENT DOCUMENTS

957235  5/1964  United Kingdom.

Primary Examiner—Malcolm F. Hubler
Attorney, Agent, or Firm—Henry L. Hanson

[57] ABSTRACT

A microwave radar type of intruder detection system incorporating signal sensing, storing and comparison logic which enables the system to self-adapt to any preselected environment and produce a signal in the event of a predetermined change from the ambient conditions of the preselected environment.

3 Claims, 7 Drawing Figures

INTRUDER DETECTION SYSTEM

This is a continuation of application Ser. No. 715,739, filed Aug. 19, 1976, now abandoned.

BACKGROUND OF THE INVENTION

The present invention relates to an intruder detection system which is useful for purposes of surveillance, or the detecting of the presence of an intruder or a change in the environment, of a predetermined area. In particular, the present invention is concerned with a space surveillance or intruder detection system utilizing pulsed microwave radar techniques in combination with signal processing logic for indicating when the environment of a secured area has been invaded or changed beyond certain predetermined limits.

The surveillance of secured areas has been carried out utilizing varying types of apparatus incorporating automatic electronic systems as well as systems requiring active human participation. Numerous types of systems have heretofore been known but have been fairly complex in terms of installation and/or operation. The installation has frequently required, among other things, elaborate preconditioning and adjustment to accommodate the ambient environmental conditions in the space under surveillance.

Representative prior art apparatus using radiated electromagnetic energy for intrusion detection will be found in the following patents:
U.S. Pat. No. 3,512,155 issued May 12, 1970
U.S. Pat. No. 3,697,989 issued Oct. 10, 1972
U.S. Pat. No. 3,733,602 issued May 15, 1973
U.S. Pat. No. 3,886,549 issued May 27, 1975
U.S. Pat. No. 3,932,871 issued Jan. 13, 1976
U.S. Pat. No. 3,938,118 issued Feb. 10, 1976
U.S. Pat. No. 3,943,503 issued Mar. 10, 1976

The particular features lacking in the known prior art relate to the ability of an automatic system of the present type to self-adapt to the environment in which it has been located. The absence of such self-adaptability inherently restricts the flexibility of the use and application of an automatic system such as has been achieved in the present invention. Also lacking is the ability to discriminate against certain types of variable signal conditions which selectively indicate an intruder's movement beyond certain range limits.

SUMMARY OF THE INVENTION

The present invention is a new and improved microwave intruder detection system incorporating self-adaptive techniques and logic which permits the system to be quickly rendered effective upon placement and activation. The features of the system enable it to be moved or changed in its location from time to time so as to further protect against unauthorized entry into the area under surveillance by someone seeking to interrupt the system operation. The invention utilizes microwave pulses which are radiated spherically from a single point source so as to effectively illuminate or "paint" the secured area with a narrow ring of radiated energy of growing radius. As the radiated energy intersects objects in predetermined range rings in the area, signals are reflected back to a receiver and converted into a signal pattern representing the reflective pattern within one or more of the range rings of the secured area. The reflective pattern of the area, or a selected portion thereof, when converted to a signal, is established as a norm or ambient signal which may be recalled and periodically compared with future signals from the same area. A special automatic gain control and signal processing circuit is incorporated within the system to establish an ambient or reference signal and this circuit in combination with associated comparison logic then provides a basis for future signal comparison to determine when the area has been invaded or the ambient condition changed outside predetermined limits. Thus the invention has the ability to operate without generating nuisance alarms in an environment where objects, although locally fixed, exhibit limited motion. An alarm signal condition can be produced within the range rings encompassed by the operation of the system by direct or multipath reflected energy. Thus intruder motion, although shaded relative to line-of-sight with respect to the wave energy radiating element of the system, will be still detected. Such multipath reflected energy normally detrimental to the operation of systems heretofor known, is here exploited to increase the utility of the invention.

A further feature of the invention includes the ability of the system to selectively discriminate in its operation between variations in signals in one range increment and to produce an output only when there is an alarm signal condition occurring in first one and then another range increment.

DESCRIPTION OF THE INVENTION

Figure 1:
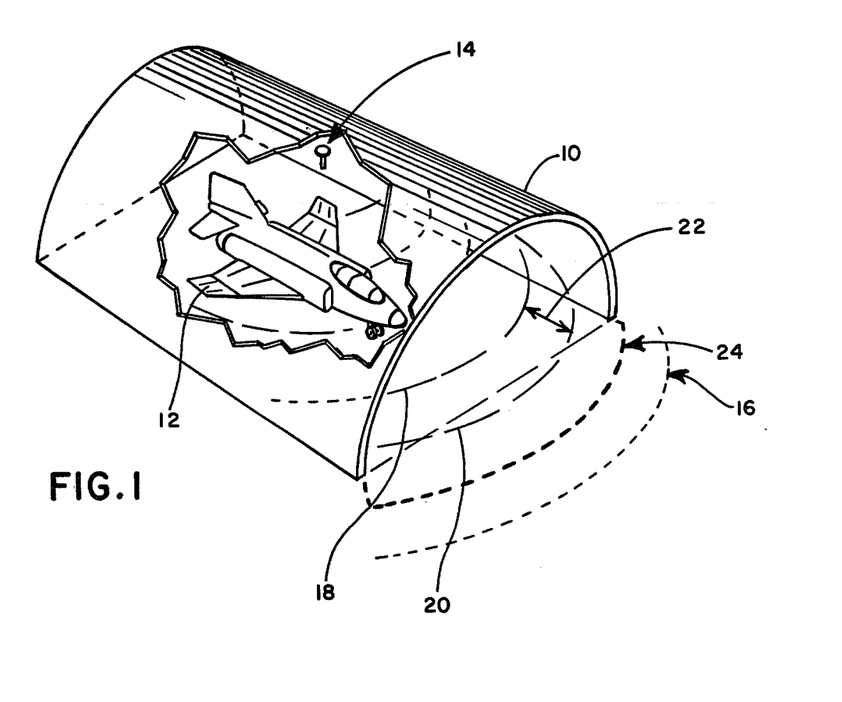
FIG. 1 is an illustration of an enclosed area or space wherein it is desired to carry on a surveillance function.

Referring first to FIG. 1, there is here illustrated an enclosure 10 in the form of an aircraft hangar which has located therein an aircraft 12. For purposes of discussing the present invention, the enclosure 10 is deemed to define a predetermined space which is under surveillance using a detection system incorporating the features of the present invention. Centrally positioned at the top of the enclosure 10 is a microwave antenna 14 which is adapted to transmit microwave energy into the space under surveillance and to receive energy reflected from objects within that space.

By definition, the outer perimeter of the area under surveillance is defined by the dotted line 16 and such a line may be arbitrarily established by adjustment of the range control portion of the circuit as discussed hereinafter. The electromagnetic wave energy radiated from the antenna 14 will move in a spherical pattern away from the antenna 14 throughout the enclosure 10 and beyond the enclosure to the extent that the ends thereof are open. This effectively illuminates or paints the space under surveillance with microwave energy. The radiated energy will be reflected back to the antenna 14 in accordance with the type and position of the objects, such as the aircraft 12, or positions thereof, within the enclosure 10. The spherical pattern of radiated energy may be arbitrarily broken down into predetermined time slots or range bins of some predetermined time dimension or distance. A representative time slot might be, for example, 20 nanoseconds, which will define a range bin of approximately 10'. Range lines on the floor of the enclosure 10 are represented by the lines 18 and 20, and the difference between those lines defines a range bin 22. A special "red line" 24 may be established as a line which, if crossed, will define a point or line where a warning signal will be generated if the system is adjusted to do its surveillance in that range.

The signals transmitted by the antenna 14 are in the form of radio frequency pulses and may be in the general range of 500 MHz insofar as the carrier frequency is concerned. Each individual pulse may be comprised of, for example, approximately 10 cycles of the carrier frequency. The repetition rate for the pulses might be, for example, 500 KHz. The particular carrier frequency, as well as the pulse repetition rate, may be selected to achieve the best match between the particular detection system and the application to be made of the system.

Figure 2:
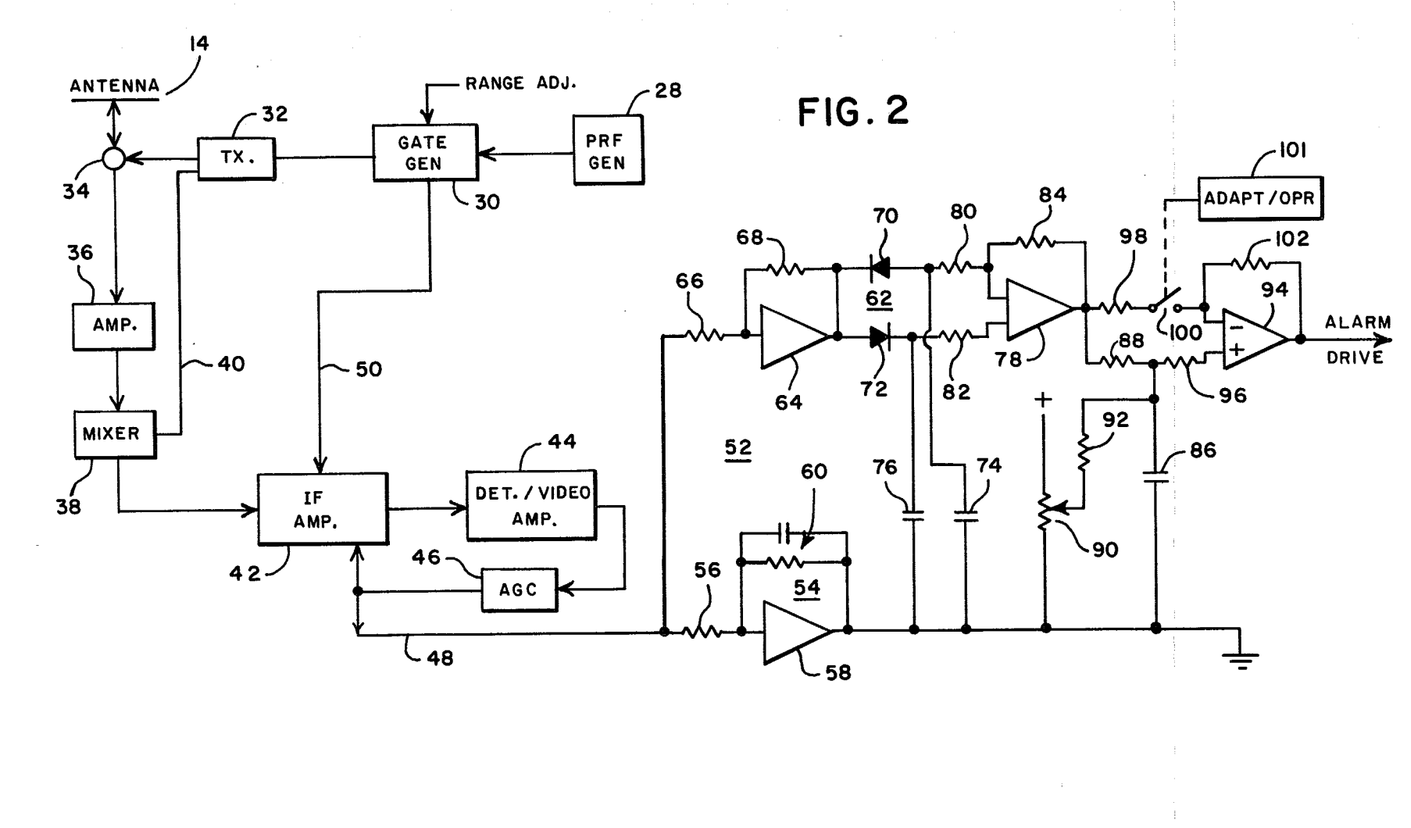
FIG. 2 illustrates diagramatically a signal control and processing circuit which may be used to carry on the basic operation of the present system in a single range increment.

Referring to FIG. 2, there is here illustrated a diagramatic showing of a representative system capable of carrying out a surveillance function with respect to a single range bin or time slot. The system will be seen to comprise a pulse repetition frequency generator or clock 28 having an output connected to a range gate generator 30, the latter of which provides an output signal to trigger a transmitter 32 which is in turn coupled to the antenna 14 by way of a transmit/receive gate 34. Separate transmit and receive antennas may, of course, be incorporated within the spirit of the present invention. Also coupled to the transmit/receive gate 34 is an RF receiver amplifier 36 which is adapted to receive signals from the antenna 14 picked up following the transmission of an RF pulse from the transmitter 32. The RF receiver amplifier 36 in turn feeds into a mixer 38 which has coupled thereto a reference signal from the transmitter 32 by way of connector 40. The output of the mixer is coupled into an IF amplifier circuit 42 wherein the signals from the mixer 38 will be amplified and then fed into a detector/video amplifier 44. The output of the amplifier 44 is coupled into an automatic gain control (AGC) circuit 46 which may take the form of a low band pass filter. This AGC circuit output is fed back into the IF amplifier 42. The AGC circuit 42 is also connected, by way of the connector 48, to the input of a further portion of a signal processing circuit, to be discussed hereinbelow. The IF amplifier 42 has a further input from the range gate generator circuit 30 by way of the connector 50. The signal from the receiver circuitry on conductor 48 is fed to a signal processing circuit 52. The signal processing circuit 52 comprises, in addition to the AGC circuit 46, a time averaging circuit 54 which includes an input resistor 56, an amplifier 58, and an RC circuit 60 which is coupled between the output and the input of the amplifier circuit 58. Also included in the signal processing circuit 52 is a minimum/maximum signal sensing circuit 62 which comprises an amplifier 64 having an input resistor 66 and a feedback resistor 68. The output of the amplifier 64 is coupled to a pair of reversely connected diodes 70 and 72, the outputs of which are connected to supply signals to a pair of capacitors 74 and 76 respectively.

The output of the minimum/maximum circuit 62 is coupled to a further amplifier circuit 78 by way of a pair of input resistors 80 and 82. The feedback resistor 84 is coupled between the output of the amplifier 78 and the input. The output of the amplifier 78 is coupled to an adaptive reference capacitor 86 by way of a resistor 88. Also coupled to the adaptive reference capacitor 86 is a tolerance adjusting potentiometer 90 having a connection from the potentiometer to the capacitor 86 by way of a resistor 92. The adaptive reference capacitor 86 is coupled to the input of an alarm drive amplifier 94 by way of a resistor 96. Also coupled to the input of the alarm drive amplifier 94 is the output of the amplifier 78 which has a connection through a resistor 98 and an adapt/operate switch 100. The output of amplifier 94 is coupled back to the input by way of resistor 102 and the output may also be coupled to any suitable indicating or control device which will be responsive to an alarm condition being indicated at the output of the amplifier 94.

Figure 3:
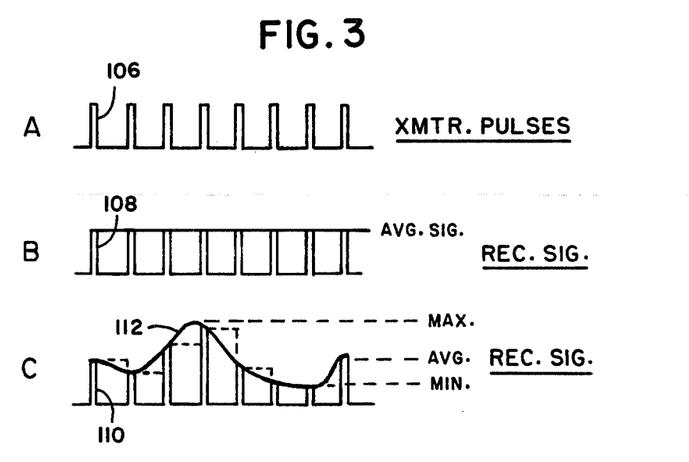
FIG. 3 illustrates representative signal patterns associated with the operation of FIG. 2.

In considering the operation of the system in FIG. 2, reference should be made to FIG. 3 wherein at A, a series of transmitter pulses are represented as occurring at predetermined fixed time intervals. These transmitter pulses at the antenna 14 are, as discussed above, in the form of a short burst of RF microwave energy radiated from the antenna into the space under surveillance. The reflected energy from the transmitted pulse will be fed back into the receiver. For any particular time slot or range bin, the reflected or back-scattered energy will be combined to produce a composite pulse whose amplitude will be directly related to the amount of energy received during that particular time slot or from that particular range bin. This composite pulse will include all of the reflected energy received during a selected time slot and may include both direct and multipath reflected energy. Thus, in FIG. 3, a transmitter pulse 106 will be radiated into the space under surveillance and, after a preselected time, dependent upon the selected time slot, the receiver will be activated to receive a signal from the desired time slot or range bin and this signal may be as represented at 108. After each transmitted pulse, a subsequent receiver signal will be monitored in a corresponding time slot, as related to the transmitted pulse, or in the same range bin as the first signal so that a series of received pulses, as shown in FIG. 3 at B, will be present. For a set of fixed conditions in the space under surveillance, particularly within the particular range bin under examination, the amplitude of the received pulses will be the same so that there will be a fixed level of signal or an average signal which will represent the static or ambient conditions of the space. The automatic gain control circuit 46 of FIG. 2 will produce on the output connector 48, a signal whose amplitude will be proportional to the ambient conditions indicated by the reflected energy from the space as amplified by the amplifiers 36 and 42 at the input. This will establish on the capacitor 86 an adaptive reference signal which will be used as a standard for signal comparisons after the initial adaptive phase has taken place. Referring back to FIG. 3, the signals at C are representative of the types of signals one might except to receive from a given time slot or range bin in the event that there is a moving object or changing condition present within that range bin. In this case, the received signals 110 will be of changing amplitude because of the fact that there is a disturbance present within the particular range bin which is causing the reflected energy to come back in varying amounts following each transmitted pulse. Thus, the different pulses received from each subsequent transmitted pulse will vary in amplitude in accordance with the reflected surfaces which are active within the range bin. As a result, the general envelope of the output of the AGC circuit 46 will no longer be of fixed amplitude but will rather take the general form indicated in 112, it being recognized that the gain control circuit will actually produce a series of step signals in accordance with the amplitude of the received pulses which steps may be averaged into the general form of return envelope as indicated at 112. In practice the number of received pulses processed for a particular range bin will be considerably more than as illustrated in FIG. 3.

Referring back to FIG. 2, when a signal such as that indicated at 112 in FIG. 3 is received, the minimum/maximum circuit 62 will produce an output signal which is indicative of the difference between the minimum and the maximum of the amplitude of AGC voltage occurring over a given time interval. The amplitude of the output of the amplifier 78, if sufficient to overcome the threshold setting or tolerance setting signal derived from the potentiometer 90, will produce an output signal adequate to cause the amplifier 94 to operate and produce an alarm drive signal on the output thereof. Thus, a moving target entering the area defined by the limits of the selected range bin, such as the range bin 22 in FIG. 1, will produce a change in the minimum/maximum AGC differential signal relative to the adaptive reference signal. When this signal differs from the reference by an established margin, a valid target entry is declared and an "intruder present" decision is made.

It will be apparent that the apparatus as illustrated in FIG. 2 computes and processes only the difference between the minimum and the maximum values of the AGC peak excursions so that background noise from static (non-moving) objects is effectively removed. In other words, energy reflected from static objects has a constant phase relationship relative to the remainder of the back-scatter energy with a resultant AGC pulse amplitude which is constant and proportional to the vector sum of the total back-scatter contributors within the particular time slot or range bin. Thus, the peak differential between the minimum and the maximum of the signals received under static conditions will be minimal. Recognizing that it may be desirable to accommodate small variations within a particular range bin, particularly as might be encountered in an environment where there may be birds, small animals, and movable foilage present, it is possible to adjust the level at which a maximum/minimum difference signal will produce an output alarm signal by adjusting the tolerance potentiometer 90. This type of approach to signal processing is not subject to problems of frequency sensitivity as are similar systems using doppler filters, for example.

In actual operation, the apparatus of FIG. 2 will have two basic operational phases, the first being an "adapt phase" during which time the apparatus adjusts itself to the static conditions and then a "operate phase" at which time the alarm circuits are conditioned and ready to be activated. The time duration of the adapt phase will vary in accordance with the particular application of the apparatus. During this phase, the desired range bin will be selected at the range gate generator 30 to define the time or range gate. Such may be adjusted to select, for example, the range bin 22 in FIG. 1. Also, the adapt switch 100 will be open so as to prevent any alarm type signals being fed to the output amplifier 94 while the reference signal for the selected range bin is being established on capacitor 86. By way of a manual operation 101 or by way of an automatically timed switch operator, not shown, the switch 100 will be closed a predetermined time following activation. In one embodiment of the apparatus, the system was designed to adapt itself in a period of approximately 15 seconds and then it could be switched to the operate mode at which time the alarm amplifier 94 was conditioned as by way of the closing of the input switch 100. The system may also be operated so that it alternately conditions itself in the adapt mode and then switches back to the operate mode to thereby adjust to certai types of varying conditions of a non-alarm type that may be occurring within the space under surveillance.

Figure 4:
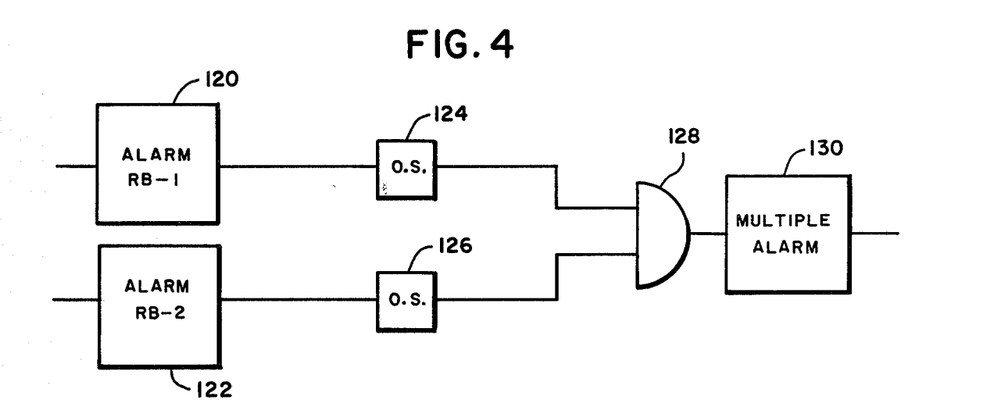
FIG. 4 illustrates a representative circuit arrangement for sensing an intruder signal moving from one range increment into another.

In certain types of applications, it may be desirable to work with a plurality of range bins or time slots so as to provide greater information on the movement of an intruder or a like type of changing condition which indicates that an alarm should be activated. The apparatus of FIG. 2 is one which performs surveillance in a single range bin. In certain applications, there may be no concern if an alarm condition exists within only a single range bin but if that condition should move from one range bin to another, an alarm should then be activated. The use of multiple range bins does, of course, require the expansion of the system so that a plurality of range bins will be sequentially examined. Thus, the circuitry of FIG. 2, insofar as the gated output of the receiver amplifier and the associated gain control and signal processing circuits are concerned, will have to be repeated, particularly in the analog mode, to define the signal conditions for the numbers of individual range bins under examination. This requires the use of a range gate signal which will define a series of separate time slots following each transmitted pulse. The circuitry of FIG. 4 is a representation of apparatus that may be used with a multiple system having sensing and processing circuitry for a pair of range bins, each of which will have an output alarm circuit 120 and 122 respectively corresponding to that of FIG. 2. The output of the alarm circuits 120 and 122 are each coupled to a pair of latching or one-shot multivibrator circuits 124 and 126 respectively. The outputs of these two circuits are in turn coupled to an AND gate 128 whose output is in turn coupled to a further alarm circuit 130. The circuit 130 is adapted to be activated when a signal passes through the AND gate 128.

In considering the operation of FIG. 4, the presence of an alarm signal for range bin RB-1 at circuit 120 will trigger the one-shot circuit or latching circuit 124 for a period of time. This will activate one of the two inputs of the AND gate 128. The gate 128 will remain closed until such time as another alarm signal is received from the adjacent range bin RB-2 alarm circuit 122 which in turn will activate its output one-shot or latching circuit 126. As long as there is a time overlap between the output signals of the latching circuits 124 and 126, both of the inputs to the AND gate 128 will be activated and there will be an output signal to activate the multiple alarm circuit 130. It will be readily apparent to those skilled in the art that the implementation of this two range bin logic may be expanded so that further logic may be combined to produce signals which will allow the tracing of an intruder through a particular space under surveillance with an alarm condition being established when a predetermined set of alarm conditions have been noted with respect to the different range bins of the space under surveillance.

Figure 5:
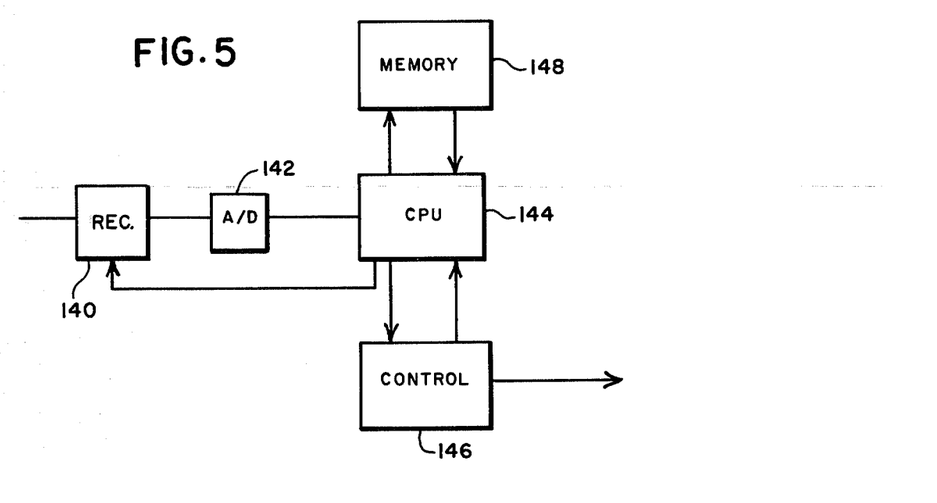
FIG. 5 illustrates diagramatically a representative arrangement for implementing the features of the invention using digital techniques.

Because of the fact that certain types of applications involve a large number of range bins, it becomes desirable to implement the signal processing for the various bins using digital signal processing and storing techniques. This form of implementation involves the generation of digital reference data for each of the bins under surveillance and then, when shifting to the operating mode, making appropriate digital representations of the differential signals between the minimum and maximum signal levels in each range bin for purposes of comparison with the reference signal for that range bin. In the digital implementation of the system, the particular techniques utilized will, of course, depend upon the type of digital circuit selected. Such implementation may be carried out by way of a microprocessor, such as the INTEL 8080, having coupled thereto an appropriate input, control circuitry, memory and output. FIG. 5 is a representative showing of the basic circuit configurations required for the digital approach to the handling of the present invention. In this figure, a receiver circuit 140 is provided which has its output coupled to an analog/digital converter 142. The output of the converter 142 feeds into the input of a central processing unit (CPU) which is in turn under the control of a control circuit 146. A memory circuit 148 is provided to store the digitized signals which will have to be prepared during the adapt phase and then compared with current data during the operate phase. The manner in which the apparatus of FIG. 5 is programmed to operate will, of course, depend upon the particular microprocessor selected. The basic flow chart for the operation of circuitry of the type shown in FIG. 5 is illustrated in FIG. 6.

Figure 6:
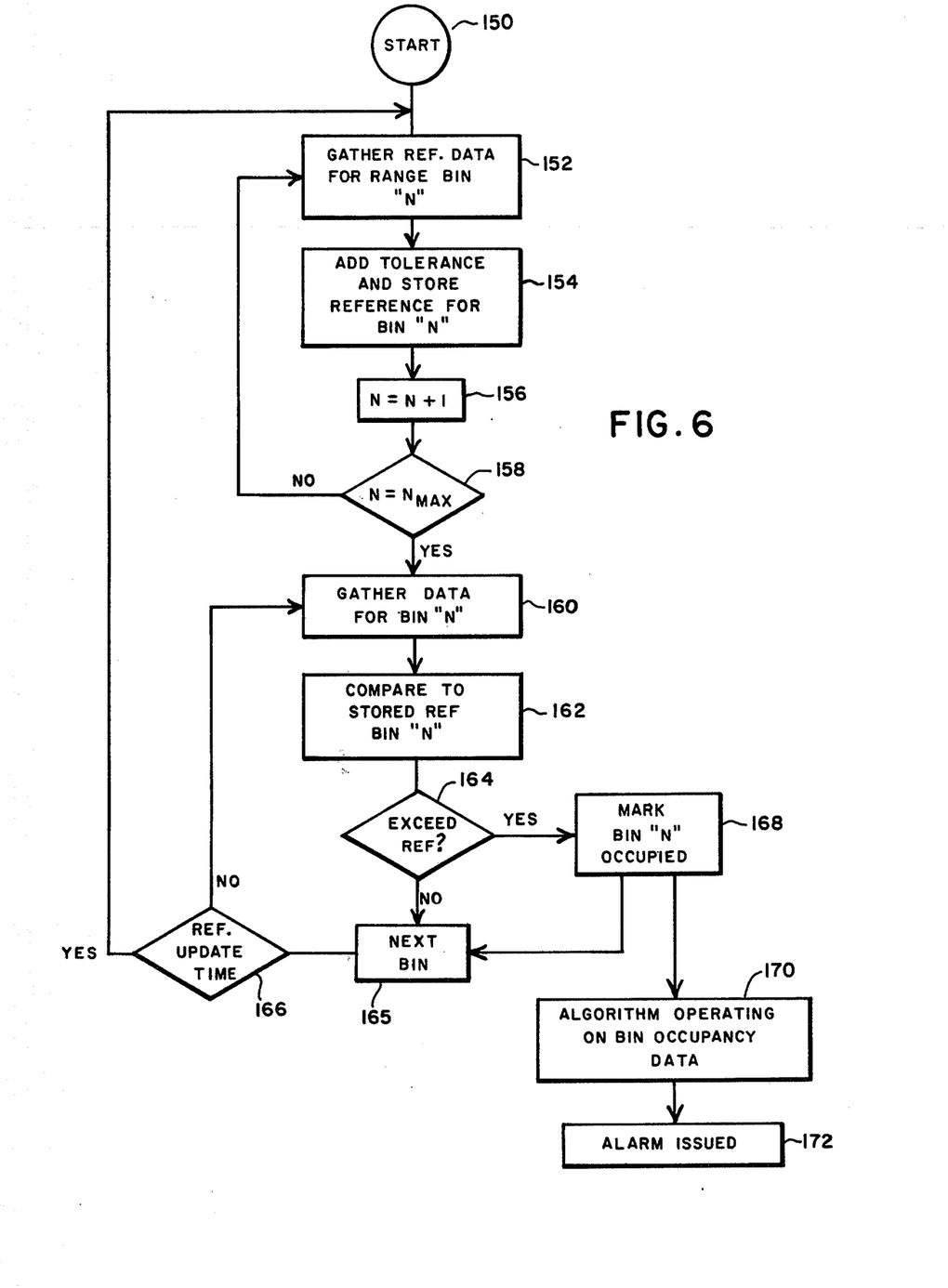
FIG. 6 is a representative operational flow chart to illustrate the control and functioning of the digital apparatus of FIG. 5.

Referring next to FIG. 6, the sequencing of the digital implementation is first initiated by an appropriate start signal 150 at which time the alarm circuits are deactivated and the system will begin to gather the standard or reference data for each of the range bins under examination. The number of range bins will, of course, vary, but each bin is represented by a particular number which may define an address location (s) in memory for the data relating to that bin. In the diagram of FIG. 6, once the operation of the apparatus is started, there is a gathering of reference data for each range bin as indicated at 152. Once the reference data for range bin "N" has been established, the next function, as indicated at 154, is to add a tolerance signal to the basic reference signal. The resultant combined signals are then stored in memory at a location for that particular bin "N". The apparatus will then sequence, as at 156, to the next range bin as represented by the number N+1. The system will then check, as at 158, to determine if N+1 represents the outer limit of the range bins $-N_{max}$. If it does not, the "No" signal, as shown in the flow diagram, will direct that the system continue to accumulate reference data for the next bin as at 152. When the reference data for all bins has been generated and stored, the "Yes" signal from 158 will indicate that the adapt phase of the operation has been completed and the system is now ready to go into its operating phase.

When the system switches into the operating phase, data will be gathered for each bin and sequentially examined. Thus, the data for bin "N" will be gathered as at 160 and compared to the stored reference data for the bin "N" as at 162. If the comparison indicates that there is no difference between the stored and gathered data at 164, the system, by way of the "No" signal, will step on to call up the gathered data for the next bin, as at 165, after first determining whether or not it is necessary to update the reference data as at 166. If it is not time to update the reference data, the No signals from 166 will activate the system for the further gathering of data for the next bin in the sequence. The sequencing will continue with respect to all of the bins in the area under surveillance until such time as the gathered data for some bin indicates that it has exceeded the value of the reference data by a predetermined amount, in which case there will be a "Yes" signal generated from 164 to mark the particular bin which is "occupied" as at 168. This bin occupied information may be stored and also used to trigger an alarm circuit, depending upon the particular application being made of the system. The system may also continue to activate the data-gathering phase for subsequent bins by 165 even though an alarm condition has been indicated in one bin. The power of the system, in terms of its informational indicating and alarm generating capacity is concerned, may be considerably expanded by operating on the data associated with the indicated occupation of a particular bin by an intruder or an alarm condition. Thus, for example, by noting the time at which an entry is made into a particular range bin, as well as when movement is sensed in a further range bin, the system may provide for the digital equivalent of the analog circuit shown in FIG. 4. This may be further expanded so that as an intruder moves through a series of range bins, the movement may be followed and it is possible to determine when the intruder has moved past the point closest to the transmitting antenna and is, in fact, starting to move away from the transmitter. In the flow chart of FIG. 6, there is a representation at 170 for the use of additional algorithms which will operate upon the bin occupancy data which will then activate an alarm as at 172 in accordance with the particular algorithm selected for monitoring the stored signals relating to the different bins being covered by the system.

Figure 7:
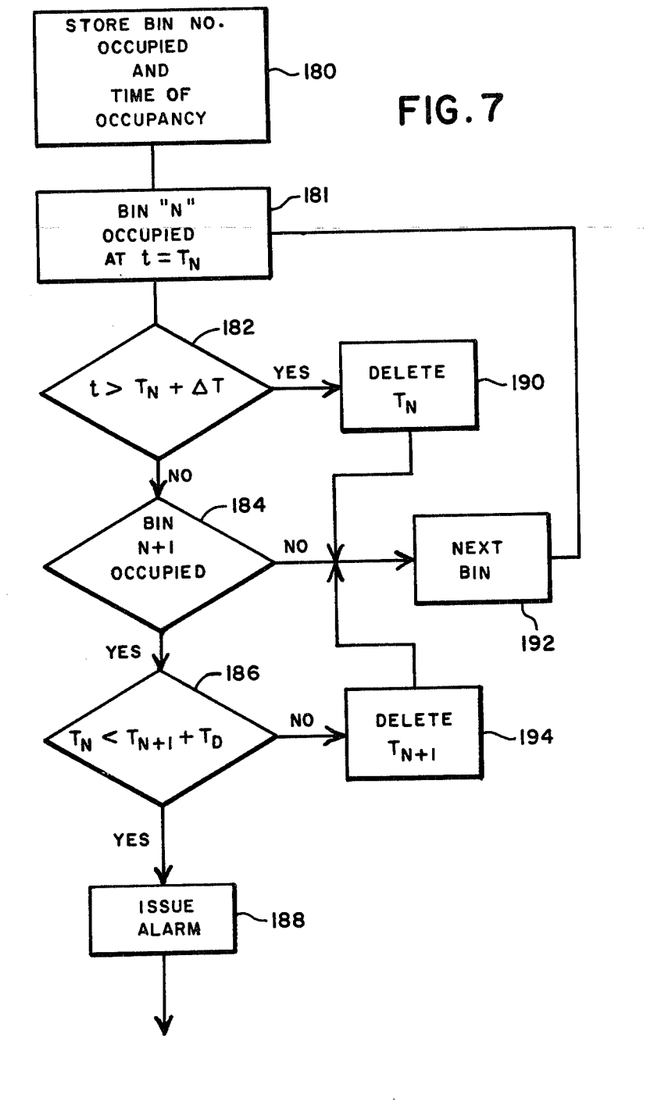
FIG. 7 is a representative operational flow charge for a further feature of the apparatus of FIG. 5.

The type of operational logic as contemplated in FIG. 4 may be performed in the digitized form of system, such as in FIG. 5, operating in accordance with the functional flow chart illustrated in FIG. 7.

Referring to FIG. 7, the data stored with respect to each particular "occupied" condition of any particular bin will also have stored therewith the time at which an intruder or alarm condition was first detected within the bin as indicated at 180. Each bin will be examined in sequence starting with bin N as at 181. The first test that is performed as at 182 is one relating to the time of detection $T_n$ summed with a permitted occupancy time $\Delta t$ which sum, if not greater than a predetermined time t, will indicate that the intruder had been within the bin N within the predetermined time interval t. If said time interval has not been exceeded, the "No" path is followed and an examination is made with respect to the next bin N+1, as at 184, which, if occupied, will produce a "Yes" output and this is then in turn tested to determine at 186 if the time associated with the occupation of the N+1 bin, plus a tolerance signal $T_D$, determined from a specification of an intruder's minimum speed, will produce a "Yes" output and thereby issue an alarm. The time checks in the above sequence enable the apparatus to selectively determine the conditions under which the movement of an intruder from one range bin to another will be considered to be an alarm condition which should be specially noted by the issuance of an output alarm signal.

In the event that the sum of the $T_n + \Delta t$ signal at 182 exceeds a predetermined established time, the "Yes" output signal will cause the deletion, as at 190, of the time and occupancy signal for the particular bin being examined and the apparatus will then step to the next bin for examination as at 192. In a similar manner, if the sum of the time for the N+1 bin plus a tolerance signal $T_D$ is beyond predetermined limits, a "No" signal in the flow chart indicates that there should be a deletion of the stored data and time for the N+1 bin as at 194 and the apparatus will then be directed to move on to the next bin in the sequence. The power of the multiple range bin processing to eliminate false alarm is, thus, demonstrated.

From the foregoing description of the flow charts on FIG. 6 and FIG. 7, it will be apparent that the power of a programmed microprocessor type of circuit may considerably expand the utility and the number of applications that can be made of apparatus incorporating the principles of the present invention. For example, special range limits or bins may be given special treatment as when, in connection with FIG. 1, an intruder has crossed over the red line 24. It will, therefore, be obvious to those skilled in the art that many modifications may be made within the spirit of the invention, and, therefore, the scope of the invention should be considered in the light of the claims in which the invention is claimed as follows:

We claim:

1. A space surveillance system for detecting the presence of an alarm condition in a given space comprising
    an electromagnetic wave transmitter having a single output antenna adapted to transmit discrete pulses of microwave energy into a space;
    an electromagnetic wave energy receiver having an input adapted to receive microwave energy transmitted into said space as reflected from objects in said space and an output;
    signal processing means having an input and an output, said input being coupled to the output of said receiver, said signal processing means including a range gate connected to the output of said receiver to selectively gate, for a predetermined period of time which defines a range time slot, all of the output signals received from said receiver during said predetermined period of time, storage means connected to an output of said range gate, automatic gain control means connected to receive the input signals from the output of said receiver and timed in a predetermined time slot established by a signal from said range gate to produce for said time slot a relatively constant level output adaptive reference signal, to be stored in said storage means, for each time slot representative of the steady state reflected signal conditions within said time slot, means including said automatic gain control circuit adapted to produce a variable signal representative of received signal excursions in said time slot, and difference signal producing means connected to the output of said gain control circuit to produce data signals based upon the difference between the maximum and minimum amplitude of the received signal excursions in said time slot;
    signal comparison means having an input coupled to the output of said signal processing means to compare a previously stored adaptive reference signal representation from said storage means with newly received data signals from said difference signal producing means;
    and an output indicator means connected to the output of said signal comparison means.

2. Apparatus as defined in claim 1 wherein said signal processing means includes a sensor circuit having an adjustable tolerance signal setting means for establishing an acceptable level of signal differential between the maximum and minimum data signals received in the selected time slot, and means including said signal comparison means connected to said sensor circuit to sense data signal excursions beyond the predetermined limits set by said tolerance signal setting means and to activate said output indicator means.

3. Apparatus as defined in claim 2 wherein the output of said tolerance signal setting means has an output that is connected to have the signal thereon combined with said adaptive reference signal on the output of said adaptive reference signal source.

* * * * *